United States Patent [19]

Ernster et al.

[11] 4,187,412
[45] Feb. 5, 1980

[54] AUTOMATIC CONTROL FOR ELECTRIC HEATING DEVICE

[75] Inventors: Peter J. Ernster, Glendale; Ernest Canamero, Appleton; James B. Cockroft, Wauwatosa, all of Wis.

[73] Assignee: Sunbeam Corporation, Chicago, Ill.

[21] Appl. No.: 922,936

[22] Filed: Jul. 10, 1978

[51] Int. Cl.² .......................................... F27D 11/02
[52] U.S. Cl. ..................................... 219/441; 99/440; 200/321; 219/435; 219/512; 337/66; 337/359
[58] Field of Search ............... 219/435, 438, 439, 441, 219/442, 510, 512; 99/344, 440, 485, 646 R; 200/321, 313, 317, 318–328; 337/359, 388, 75, 66

[56] References Cited

U.S. PATENT DOCUMENTS

| 2,761,375 | 9/1956 | Jepson | 219/435 X |
| 2,774,524 | 12/1956 | Krause et al. | 219/435 X |
| 3,143,639 | 8/1964 | Wickenberg et al. | 219/442 |
| 3,221,127 | 11/1965 | Jepson et al. | 337/359 |
| 3,258,563 | 6/1966 | Landau | 337/66 |
| 3,309,485 | 3/1967 | Gluck | 200/313 |

FOREIGN PATENT DOCUMENTS 528604  7/1931  Fed. Rep. of Germany .......... 219/441

Primary Examiner—Volodymyr Y. Mayewsky
Attorney, Agent, or Firm—George R. Clark; Neil M. Rose; Clifford A. Dean

[57] ABSTRACT

An automatic control for egg cookers, baby bottle warmer, etc. is designed around a conventional slide switch of the type normally biased to the open position. Manually actuated means are provided to move the slide switch to its ON position, whereupon a mechanical latch automatically latches onto the knob of the slide switch to hold it in its ON position. When the cooking has been completed, a bi-metal releases the latch and permits the biasing means to open the switch and terminate the heating.

5 Claims, 8 Drawing Figures

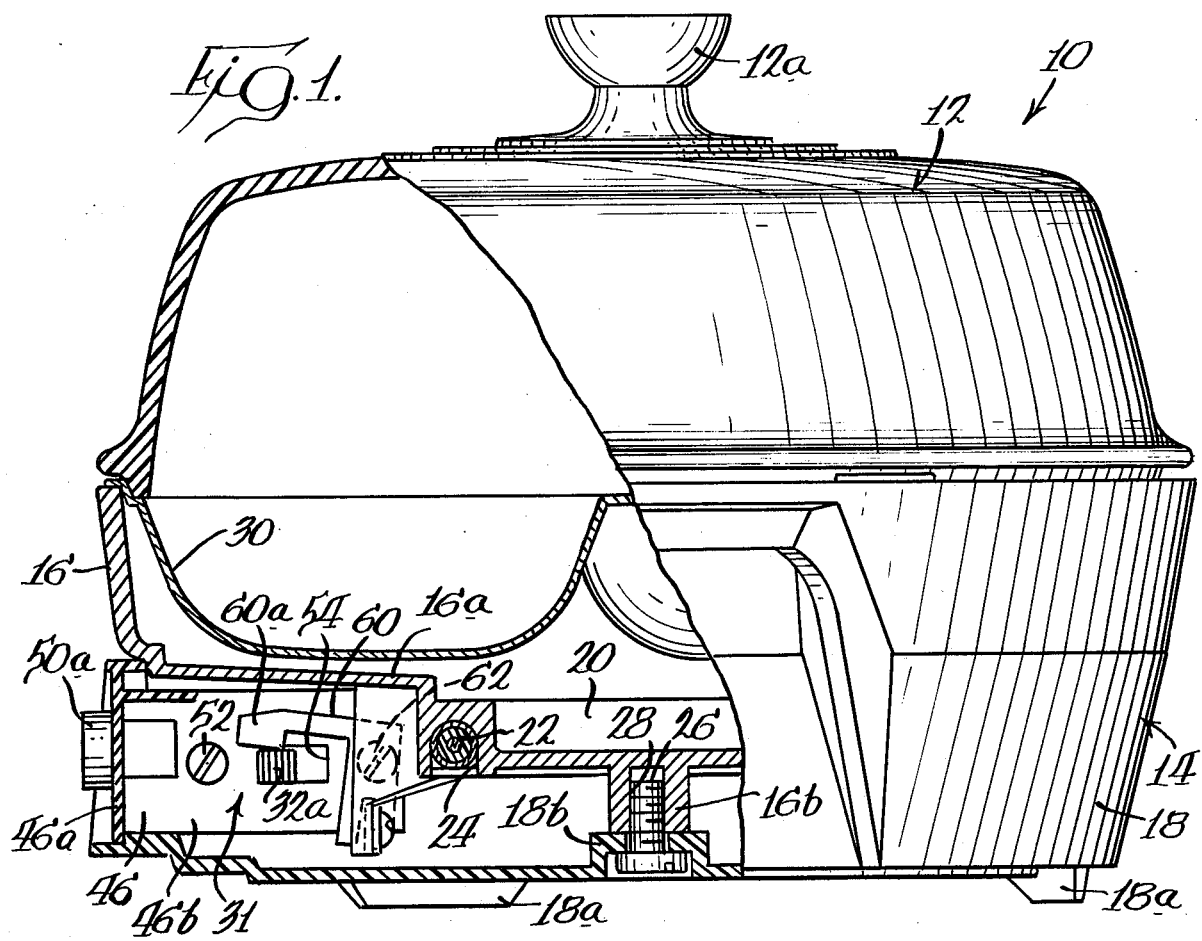
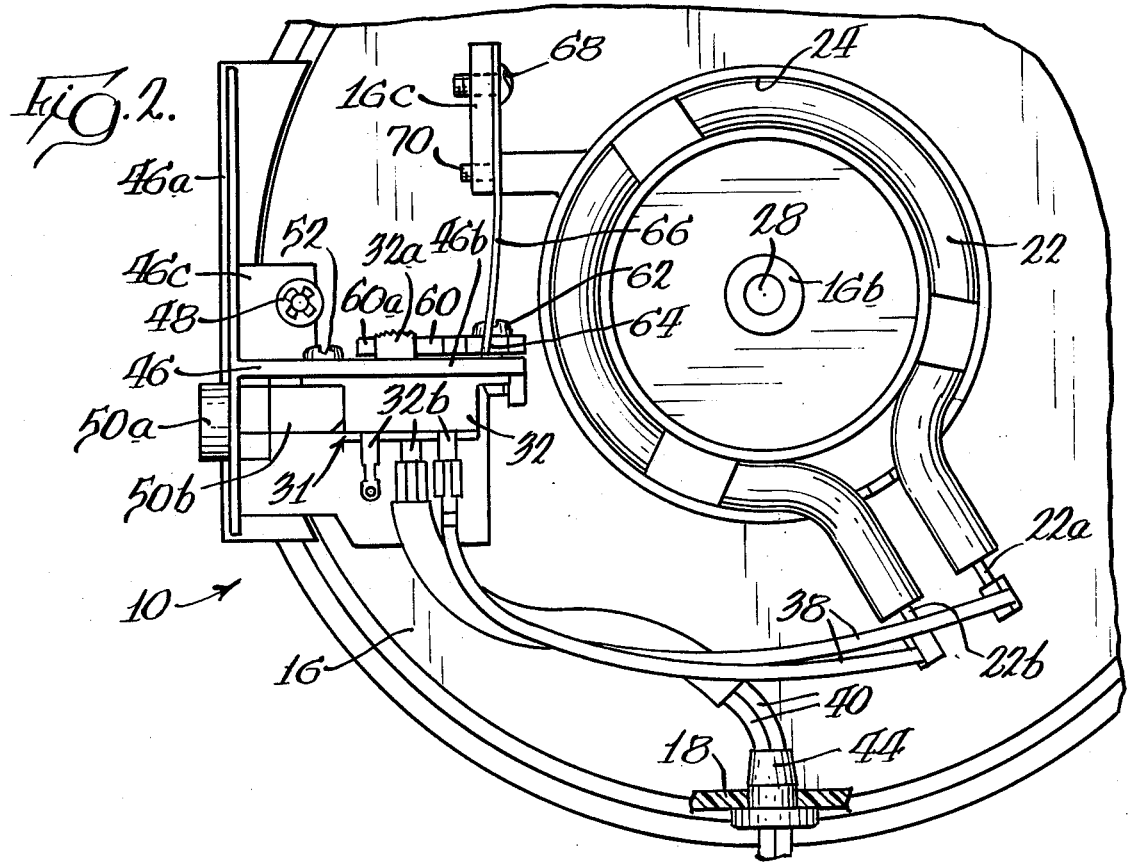

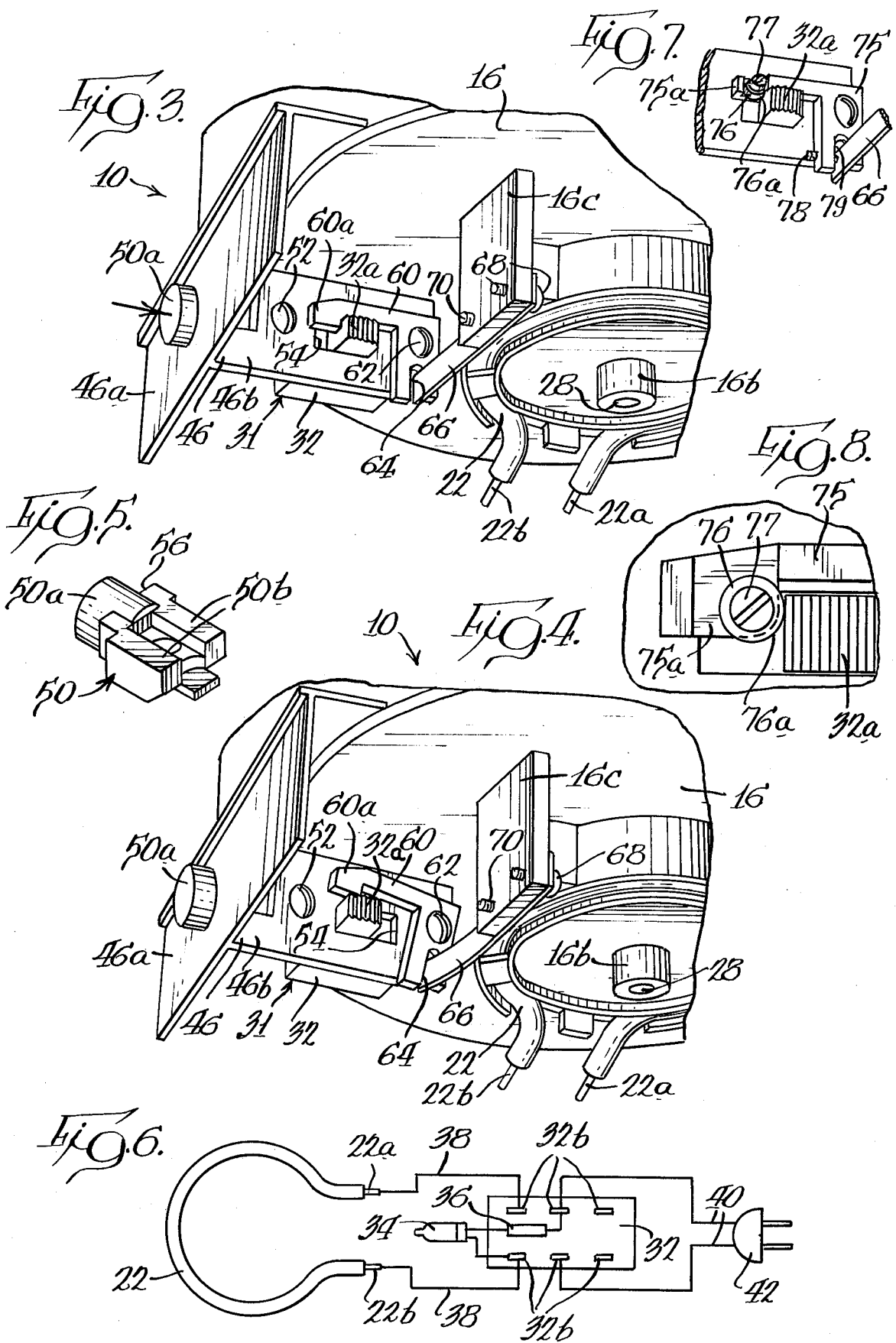

AUTOMATIC CONTROL FOR ELECTRIC HEATING DEVICE

BACKGROUND OF INVENTION

1. Field of the Invention

The device of the present invention relates to a simple and improved control for automatically terminating a heating operation such as terminating the heating operation in an electric egg cooker when the eggs are cooked to the desired degree.

2. Description of the Prior Art

A very popular automatic egg cooker of the type with which the present improved control is to be used has been extensively sold for more than fifteen years. Such an egg cooker is disclosed in U.S. Pat. Nos. 2,761,375—Jepson and 3,143,639—Wickenberg et al. In such prior art egg cooker (or baby bottle warmer) a control which is manually actuated to start the heating operation is actuated, upon a rise in temperature that would indicate the heating operation was completed, to terminate such operation. To this end, the degree to which eggs were cooked was determined by placing selectively different amounts of water into an egg cooking vessel and relying upon the time it took to evaporate this water to determine the duration of the heating cycle. The design was such that as long as there was water in the vessel being heated, the temperature of the bottom of the vessel would not substantially exceed the boiling temperature of water, but as soon as all the water was evaporated the temperature would rise rapidly and this rapid change in temperature of the bottom of the vessel was utilized to terminate the heating or cooking operation.

In such prior art egg cookers, it was necessary to provide a complicated switching means and temperature response control means which could be manually actuated to the closed position to supply energy to an electric heating element, then would remain in such position until the heating operation was completed, and thereafter the switching means would interrupt the electric circuit to the heating element with a snap action. The controls of such prior art arrangements worked very well but they were much too expensive and complicated.

It would be desirable to provide a temperature responsive control means for automatically controlling a heating device which device is less expensive to manufacture, and yet which is equally as fool-proof in operation as the arrangement disclosed and claimed in Jepson U.S. Pat. No. 2,761,375 and Wickenberg et al. U.S. Pat. No. 3,143,639. To accomplish this the improved control means should use conventional switches which are made by the millions and are relatively inexpensive and which could be employed to perform all the functions of the more expensive and elaborate prior art controls.

SUMMARY OF THE INVENTION

An object of the present invention is to provide a new and improved automatic control for an electric egg cooker or similar heating device to terminate the heating or cooking after a preselected heating interval.

Another object of the present invention is to provide an automatic control for an electric egg cooker or similar heating device which is simple and inexpensive to operate, very compact in construction, and fool-proof in operation.

Still another object of the present invention is to provide an automatic control for a heating device using a conventional slide switch of the type normally biased to the open position.

Further objects and advantages of the present invention will become apparent as the following description proceeds, and the features of novelty which characterize the invention will be pointed out with particularity in the claims annexed to and forming a part of this specification.

BRIEF DESCRIPTION OF THE DRAWINGS

For a better understanding of the present invention, reference may be had to the accompanying drawings in which:

FIG. 1 is an elevational view, with certain portions thereof cut away, of an automatic egg cooker embodying the automatic control means of the present invention;

FIG. 2 is a bottom view of a portion of FIG. 1 with the base or housing removed to permit a better disclosure of the improved control means of the present invention, assuming that FIG. 1 shows the complete structure;

FIG. 3 is a perspective view of a portion of the device of FIG. 1 showing the improved control means of the present invention immediately following the time when it has been actuated to initiate a heating operation;

FIG. 4 is a view similar to FIG. 3 but showing the automatic control means of the present invention in the condition just as the control has functioned to terminate the heating operation;

FIG. 5 is a perspective view of one element of the control means of the present invention; and FIG. 6 is a schematic diagram illustrating the electrical circuit of the heating device employing the control means of the present invention.

FIG. 7 is a fragmentary perspective view of an alternative embodiment of the present invention;

FIG. 8 is a fragmentary plan view of the hook-shaped portion of the latching member of FIG. 7.

DETAILED DESCRIPTION OF THE PREFERRED EMBODIMENT

Referring now to the drawings, there is illustrated a heating device in the form of an egg cooker generally indicated at 10, the details of which other than the automatic control means associated therewith form no part of the present invention, but are disclosed and described more clearly to illustrate the operation of the improved control means of the present invention. Although the device 10 is designated as an egg cooker, it might equally well function as a baby bottle warmer as is mentioned in the aforementioned prior art patents.

As illustrated, the heating device 10 comprises a cover 12 and a lower heating vessel and base assembly generally designated by the reference numeral 14. The cover 12 may be formed of any suitable material, but preferably is formed of a heat resistant glass, with a suitable knob 12a to permit ready manipulation by the user. The lower heating vessel and base assembly 14 includes a vessel portion 16 preferably formed of cast aluminum or similar metal of good heat conductivity. The lower heating vessel and base assembly 14 further includes a base or housing 18 preferably molded from a suitable insulating material. The particular construction of the cover 12, the vessel 16 and the base or housing 18 form no part of the present invention, but are illustrated only for the sake of making a complete disclosure. They may actually take the form of the corresponding parts of these elements disclosed in Wickenberg et al. U.S. Pat. No. 3,143,639.

The vessel 16 is illustrated as of a relatively shallow, tapered wall, circular, open-topped container having a bottom 16a integrally formed with somewhat outwardly tapered side walls. The bottom 16a is indicated as having a slope toward the center to define a shallow central recess 20. This recess 20 defines the lowest level of the bottom 16a, and obviously as liquid contained in vessel 16 is evaporated upon heating it will flow by gravity toward the center and eventually the last remaining water will be contained in the central recess 20.

For the purpose of supplying the necessary heat to cook any eggs supported in the vessel 16 beneath the cover 12 or to heat a baby's bottle in the event that it is used for that purpose, there is provided a suitable electric heating element generally designated at 22. This heating element 22 is preferably one of the well-known sheathed type, which conventionally comprises an outer metal sheath within which is disposed a suitable length of resistance wire, coiled in the form of a helix and surrounded by a refractory composition, which refractory composition is a good electrical insulator but yet a good heat conductor. Preferably, the heating element 22, as best shown in FIGS. 2, 3, 4 and 6 of the drawings is bent into the form of a substantially one-turn ring which is sometimes referred to as a C-configuration and is inserted within a recess 24 of appropriate shape, defined during the casting operation of the vessel 16. Of course, the heating element could be cast directly into the bottom of the vessel, but placing it in the groove or recess 24 and staking it in position provides intimate heat exchange between the vessel bottom 16 and the heating vessel at less expense. As shown in the drawings, the heating element closely surrounds the recess 20 defined in vessel 16. Preferably, suitable rigid terminals 22a and 22b project from the ends of the sheath of the heating element to permit electrical connection to be made to a source of electrical energy.

In order to support the heating vessel 16 on a table, counter or other support, the base or housing 18 is molded from suitable insulating material and provided with spaced integral legs 18a so that the egg cooker may be disposed on any surface. For the purpose of securing the base 18 to the vessel 16, the vessel 16 is provided with an integral, cylindrical, depending center porjection 16b which projects downwardly to engage a raised portion 18b of the base 18. A suitable fastening means 26 threadedly engaged in a tapped opening 28 in projection 16b holds the two parts 16 and 18 in the assembly 14 somewhat in the manner disclosed in the Wickenberg et al. U.S. Pat. No. 3,143,639.

Suitable means for supporting eggs or other material to be heated are provided. By way of illustration, there is shown in FIG. 1 of the drawings a conventional poaching pan 30 which is suitably supported within the vessel 16 in a manner well-understood by those skilled in the art. Of course, other means for supporting eggs to be boiled or other matter to be heated may be employed within the vessel 16.

The present invention is primarily concerned with temperature responsive control means for terminating the heating produced by the heating element 22 when the desired heating has been obtained. To this end, there is provided temperature responsive control means generally designated as 31. In accordance with the present invention, this temperature responsive control means is designed to utilize the very satisfactory snap-acting slide switches normally biased to the open position which had been extensively sold on the market for a considerable time. The present invention employs a slideswitch of the type disclosed in U.S. Pat. No. 3,309,485—Gluck. This slide switch is designated as 32 in the drawings. The details of said switch are fully disclosed in said U.S. Pat. No. 3,309,485 and since these details form no part of the present invention they are not described here except in general terms. Such switches generally include a U-shaped metal housing with the area defined by the ends of the legs of the U remote from the bight of the U, spanned by an insulating contact support. Slidably mounted in the open ended housing defined by said U-shaped member and said contact support is a switch actuator in the form of a slidable member preferably formed of nylon or similar material having an integral actuating knob 32a projecting through the bight of the U-shaped housing. The conventional slide switch is a double pole, double throw switch with six terminals and with a spring return detent. These terminals are designated as 32b in FIG. 6 of the drawings, only four of which are used in the illustrated application of the present invention. As shown in Gluck U.S. Pat. No. 3,309,485 a suitable neon bulb 34 is provided which is energized when the switch is in the closed position through a current-limiting resistor 36 by being connected across two of the terminals 32b of switch 32.

The switch 32 and the circuit controlled thereby is best shown in the schematic diagram of FIG. 6. As illustrated the terminals 22a and 22b of the heating element 22 are connected by connectors 38 to one pair of terminals 32b of switch 32 while the pair of center terminals of this switch are connected by conductors 40 to a conventional plug connector 42.

A suitable strain relief 44 is provided where the conductors 40 pass through the wall of housing or base 18.

With this type of slide switch 32, when the knob 32a is moved to the ON or closed position, current flows to the heating element 22 when the plug connector 42 is connected to a suitable source of electrical energy. Since switch 32 is always strongly biased to the open position, unless it is held in the closed position, the circuit to the heating element 22 will be open and no power will be supplied to the terminals 22a and 22b of the heating element 22.

For the purpose of supporting the temperature responsive control means 31 of the present invention including slide switch 32 in association with the heating device it is to control, there is provided a generally T-shaped insulating supporting means or chassis generally designated as 46. The T-shaped supporting means 46 includes a front panel 46a and a leg 46b joined to form a T. To secure the chassis 46 to the bottom of the vessel 16 by suitable fastening means 48 (see FIG. 2) the leg 46b is provided with a lateral flange 46c and the fastening means 48 clamps the chassis 46 to the underside of bottom 16a of vessel 16.

The front panel portion 46a of T-shaped supporting member 46 has a circular opening defined therein to receive the cylindrical button portion 50a of a reciprocally movable switch actuating member 50 which button 50a may be depressed to move the slide switch 32 to its closed position. The slide switch 32 is secured to the leg 46b of supporting member 46 by suitable fastening means 52 whereby the slide switch is effectively secured to the support means or chassis 46 and, hence, to the vessel 16. The leg portion 46b of T-shaped chassis 46 is provided with an elongated opening 54 through which the knob 32a of slide switch 32 projects, the elongated opening permitting sliding movement of the knob. The ON or closed position of the knob 32a of slide switch 32 is shown in FIG. 3 of the drawings and the OFF or open position in FIGS. 1 and 4 of the drawings.

To move the switch 32 to the closed position, the switch actuation member 50 is provided with an enlarged forked integral projection 50b on the end thereof opposite button portion 50a. The junction between the cylindrical portion 50a and forked portion 50b defines a shoulder 56 engageable with the inside surface of front panel portion 46a of chassis 46 thus limiting the maximum outward movement of button portion 50a. The forked portion 50b extends into the open end of the housing of switch 32 whereby depression of button or button portion 50a moves switch 32 to the closed position shown in FIG. 3 of the drawings against the bias which moves the switch to an open position. This bias also moves the button 50a so the shoulder 56 engages panel portion 46a.

In accordance with the present invention and for the purpose of holding the slide switch in the ON or closed position, when it is desired to energize heating element 22, there is provided an L-shaped latching member 60 pivotally mounted as best shown in FIGS. 1, 3 and 4 by pivot means 62 to one side of leg 46b of supporting means 46. The pivotally mounted latching member 60 has a hook-shaped latch portion 60a at the end of one leg of the L and an elongated slot 64 is defined in the end of the other leg of the L, the pivot 62 being in the area of the junction between the two legs of the L. Latching means 60, as illustrated, is pivoted to what is the side of the vertcally disposed leg portion 46b of T-shaped member 46 and designed so that gravity will cause the latching member to pivot in a counter-clockwise direction as viewed in FIGS. 1, 3 and 4 of the drawings. Instead of relying on gravity, a suitable spring means may be provided to insure movement of the latching member toward its latching position. When the button 50a is depressed to slide the switch knob 32a to the right as viewed in the drawings, then the latch portion 60a of the latching member 60 moves to the latching position shown in FIG. 3 and the slide switch 32 will be held in its closed position to energize the heating means 22. This condition will continue until the switch button 32a is released by the latch means 60a to move back to its normal position under the bias of the spring included as part of the slide switch. This open position of the normally open slide switch is shown in FIGS. 1 and 4 of the drawings.

In order to terminate the heating operation when the desired heating is accomplished, there is provided a bimetallic element 66 which is secured to a downwardly extending projection 16c integrally formed with the vessel 16. One end of the bimetallic element 66 is secured to this projection 16c by means of fastening means 68 while the other end is received within the notch or slot 64 in the latching member 60. A suitable calibration screw 70 may be provided to adjust the effective temperature at which the free end of the bimetallic element, which extends horizontally beneath the vessel portion 16, operates latching means or member 60. The high expansion side of the bimetallic element 66 is arranged so that as the element deflects with heating it will tend to pivot the latching member in the clockwise direction as viewed in FIGS. 3 and 4 of the drawings and when sufficient heating occurs, the latch 60a will release the switch knob 32a and the switch 32 will open.

While the invention has been fully described hereinabove with reference to the latching means 60 as shown in FIGS. 1, 3 and 4, an alternative embodiment for the latching means 60 is shown in FIG. 7 and FIG. 8. When it is desired that the automatic switching operation be performed with increased smoothness and uniformity throughout many repeated cycles, the egg cooker may be constructed to include a latching means 75 as shown in FIG. 7 and FIG. 8. The latching member 75 in this alternative embodiment has essentially the same L-shape configuration as latching member 60. However, member 75 has a hook-shaped latch portion 75a which is recessed to receive a roller means 76 and a roller supporting means 77. The roller supporting means 77 comprises a shoulder bolt on which the cylindrical roller 76 is journalled for rotation. The roller 76 has an outer bearing surface 76a which is positioned to engage the switch knob 32a during the switching cycle. The roller means 76 provides a bearing which rolls against the switch knob 32a to reduce friction as the latching member 75 pivots out of restraining engagment with switch knob 32a. Accordingly there is provided rolling contact between the latch member 75 and the switch knob 32a, thereby reducing frictional wear resulting from repeated operation, and correspondingly minimizing the frequency of readjustment of the bimetallic element 66. In the embodiment of FIG. 7 and FIG. 8 there is shown a second or alternative calibration means which comprises a screw 78 threadedly received in latch member 75 so as to extend into notch or slot 79 in the latching member 75 if it is desired that greater accuracy by obtained in the adjustment of the temperature responsive bimetallic element 66.

In view of the detailed description included above, the operation of the control means 31 of the present invention will readily be understood by those skilled in the art. When it is desired to perform a cooking operation, such as poaching or boiling eggs, a predetermined quanity of water is inserted into the vessel 16, the amount of which determines the length of the cooking operation. This feature is not part of the present invention but is fully disclosed in the aforementioned U.S. Pat. Nos. 2,761,375 and 3,143,639. When the desired quantity of water has been placed in the cooking vessel 16 and the items to be cooked are also included beneath the cover 12, the user depresses push-button 50a with the result that the knob 32a is moved to the right as viewed in FIGS. 1, 2 and 3 of the drawings until it reaches the position of FIG. 3 whereupon the latching member 54 is actuated by gravity to hold the knob 32a in the closed switch position. When all the water has evaporated, the bimetallic element 66 which is in intimate heat exchange relationship with the bottom of the vessel 16 rapidly deflects as indicated in FIG. 4 of the drawings to pivot the latching means 60 and release the switch knob whereby the heating element 22 is deenergized.

It will be appreciated that there has been provided a very simple and inexpensive control means using a standard slide switch to perform all of the functions performed by the much more elaborate controls of the aforementioned two U.S. Pat. No. 2,761,375 and 3,143,639.

While there has been illustrated and described what is at present considered to be the preferred embodiment of the present invention, it will be understood that numerous changes and modifications will occur to those skilled in the art and it is aimed in the appended claims to cover all such changes and modifications as fall within the true spirit and scope of the present invention.

What is claimed as new and desired to be secured by Letters Patent of the United States is:

1. An electric heating appliance comprising a metal vessel, an electric heating element electrically insulated from and in intimate heat exchange relationship with said vessel, a slide switch connecting said heating element to a source of electric energy, said slide switch including a housing having fixed and movable contacts contained therein, said movable contacts being supported by a switch actuator having a switch knob projecting from said housing and linearly movable between an open circuit position and a closed circuit position, said switch knob being normally biased to said open position, means for manually moving said slide switch to the closed position, a latch mounted adjacent to said slide switch for engaging said switch knob when said switch is moved to the closed position to hold said slide switch in such closed position, and means responsive to the attainment of a predetermined temperature of said vessel for releasing said latch.

2. An electrically heated cooking appliance comprising a metal vessel having an electrical heating element mounted thereon in good heat exchange relation thereto and insulated electrically from said vessel, a modular switch having a housing and a slide actuator including a switch knob projecting from said housing, an elongated bimetal element supported at one end on said vessel in good heat exchange relation thereto, said switch having an open and a closed position, means biasing said switch to said open position, said switch being connected in circuit with said heating element to control the energization thereof, latch means for automatically retaining said slide actuator in said closed switch position by means of engagement with said switch knob, said vessel being supported by an insulating base which forms with said vessel an enclosure for said switch latch and bimetal, means connected to said slide actuator and extending externally of said base to permit manual actuation of said switch to said closed circuit position, in which position it is retained by said latch, said bimetal having a free end remote from said supported end engageable with said latch to disengage said latch from said switch knob to permit said slide actuator to move to the open circuit position.

3. The electrically heated cooking appliance of claim 2 wherein said latch comprises an L-shaped member with the end of one leg of the L having a hook shaped portion for engagement with said knob and having a notch in the end of the other leg of said L for receiving said free end of said bimetallic element.

4. The electrically heated cooking appliance of claim 3 wherein gravity biases said latch to its latching position.

5. The electrically heated cooking appliance of claim 4 having a T-shaped support connected to said insulating base with said knob mounted in the head of the T and said L-shaped member mounted for pivotal movement of the leg of said T, said slide switch being supported on said leg of said T.

* * * * *